(12) United States Patent
Laudon (10) Patent No.: US 7,574,566 B2
(45) Date of Patent: Aug. 11, 2009

(54) SYSTEM AND METHOD FOR EFFICIENT SOFTWARE CACHE COHERENCE

(75) Inventor: James P. Laudon, Madison, WI (US)

(73) Assignee: Sun Microsystems, Inc., Santa Clara, CA (US)

( * ) Notice: Subject to any disclaimer, the term of this patent is extended or adjusted under 35 U.S.C. 154(b) by 440 days.

(21) Appl. No.: 11/524,837

(22) Filed: Sep. 21, 2006

(65) Prior Publication Data

US 2008/0077743 A1    Mar. 27, 2008

(51) Int. Cl.
*G06F 13/00* (2006.01)
*G06F 13/28* (2006.01)

(52) U.S. Cl. ....................................................... 711/141
(58) Field of Classification Search ................... 711/141
See application file for complete search history.

(56) References Cited

U.S. PATENT DOCUMENTS

| | | | |
|---|---|---|---|
| 5,893,153 A | 4/1999 | Tzeng | |
| 5,893,160 A | 4/1999 | Loewenstein | |
| 6,272,602 B1 | 8/2001 | Singhal | |
| 6,711,662 B2 | 3/2004 | Peir | |
| 6,751,710 B2 | 6/2004 | Gharachorloo | |
| 7,017,012 B2 | 3/2006 | Clarke | |
| 7,124,253 B1 | 10/2006 | Wright | |
| 2004/0025165 A1* | 2/2004 | Desoli et al. ................. | 719/310 |
| 2005/0021914 A1 | 1/2005 | Chung | |
| 2006/0101209 A1 | 5/2006 | Lais | |
| 2007/0022253 A1 | 1/2007 | Cypher | |

OTHER PUBLICATIONS

D. Chaiken, J. Kubiatowicz, and A. Agrawal, "Limitless Directories: A Scalable Cache Coherence Scheme", In Proceedings of the Fourth International Conference on Architectural Support for Programming Languages and Operating Systems (ASPLOS-IV), pp. 224-234, IEEE Computer Society, Apr. 1991.

D. Chaiken and A. Agarwal, "Software-Extended Coherent Shared Memory: Performance and Cost", In Proceedings of the 21st International Symposium on Computer Architecture (ISCA), pp. 314-324, IEEE Computer Society, Apr. 1994.

(Continued)

*Primary Examiner*—Matt Kim
*Assistant Examiner*—Edward J Dudek
(74) *Attorney, Agent, or Firm*—Meyertons, Hood, Kivlin, Kowert & Goetzel, P.C.

(57) ABSTRACT

Software-based cache coherence protocol. A processing unit may execute a memory request using a processor thread. In response to detecting a cache hit to shared or a cache miss associated with the memory request, a cache may provide both a trap signal and coherence information to the processor thread of the processing unit. After receiving the trap signal and the coherence information, the processor thread may perform a cache coherence operation for the memory request using at least the received coherence information. The processing unit may include a plurality of processor threads and a load balancer. The load balancer may receive coherence requests from one or more remote processing units and distribute the received coherence requests across the plurality of processor threads. The load balance may preferentially distribute the received coherence requests across the plurality of processor threads based on the operation state of the processor threads.

20 Claims, 5 Drawing Sheets

OTHER PUBLICATIONS

H. Grahn and P. Stenstrom, "Efficient Strategies for Software-Only Directory Protocols in Shared-Memory Multiprocessors", In Proceedings of the 22nd International Symposium on Computer Architecture (ISCA), pp. 38-47, IEEE Computer Society, Jun. 1995.

M. Chaudhuri and M. Heinrich, "SMTp: An Architecture for Next-generation Scalable Multi-threading", In Proceedings of the 31st International Symposium on Computer Architecture (ISCA), pp. 124-135, IEEE Computer Society, Jun. 2004.

* cited by examiner

SYSTEM AND METHOD FOR EFFICIENT SOFTWARE CACHE COHERENCE

BACKGROUND OF THE INVENTION

1. Field of the Invention

This invention relates to cache coherence protocols and, more particularly, to software-based cache coherence protocols.

2. Description of the Related Art

Shared memory multiprocessor systems typically include a large block of random access memory that can be accessed by each of the central processing units (CPUs) of the system. One issue with shared memory systems is cache coherence. Whenever one cache is updated with information that may be used by other processors, the change needs to be communicated to the other processors, otherwise the different processors may begin working with incoherent data.

Multiprocessor cache coherence is typically done in fixed hardware state machines. However, fixed hardware solutions limit the flexibility of cache coherence protocols. To enable more flexible cache coherence, a programmable coherence processor may be employed instead of hardware state machines. However, both the fixed and programmable coherence engines are costly solutions since they typically require dedicated hardware to perform the cache coherence operations.

SUMMARY OF THE INVENTION

Various embodiments are disclosed of a system and method for implementing a software-based cache coherence protocol. The system may include a cache and a processing unit including at least one processor thread. During operation, the processing unit may execute a memory request using the processor thread. In response to detecting a cache hit to shared or a cache miss associated with the memory request, the cache may provide both a trap signal and coherence information to the processor thread. After receiving the trap signal and the coherence information, the processor thread may perform a cache coherence operation for the memory request using at least the received coherence information. For instance, the processor thread may run a coherence handler to send coherence requests to one or more remote processing units to perform the cache coherence operation. The remote processing units may process the coherence requests and send reply data to the same processing thread that executed the memory request and sent the coherence requests.

In one embodiment, the coherence information provided from the cache to the processing thread may include at least a miss address. In some embodiments, if the cache is configured as a write-back cache, the coherence information provided from the cache to the processing thread may include at least a miss address, a write-back address, and a write-back buffer pointer.

In various embodiments, the processing unit may include a plurality of processor threads and a load balancer. The load balancer may receive coherence requests from one or more remote processing units and distribute the received coherence requests across the plurality of processor threads. In one embodiment, the load balance may determine an operational state of each of the plurality of processor threads and distribute the coherence requests across at least a subset of the plurality of processor threads based on the operation state of the processor threads. For instance, in one specific implementation, the load balancer may preferentially distribute the coherence requests across the processor threads that are in a sleep state.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 1:
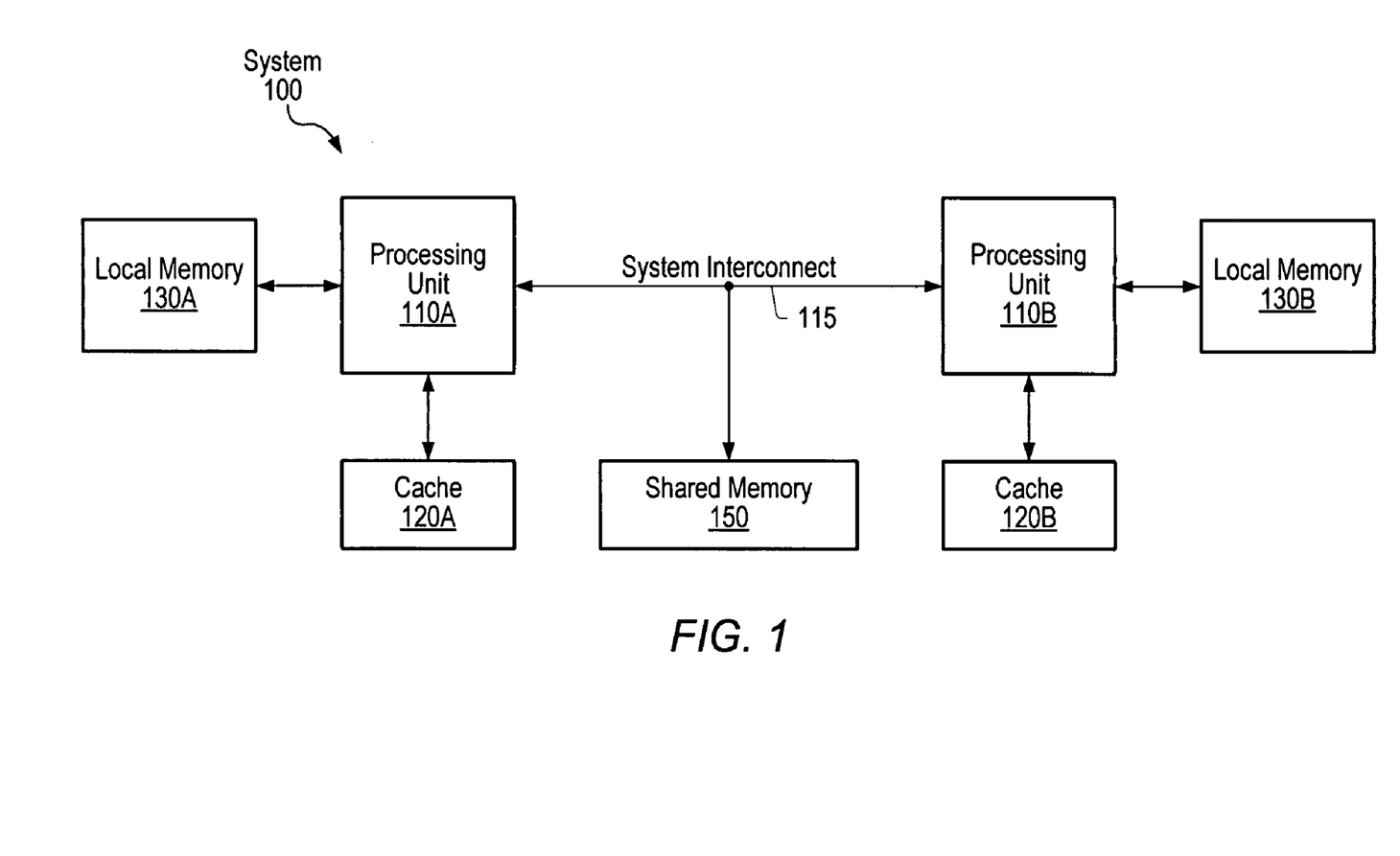
FIG. 1 is a block diagram of one embodiment of a multi-processor system.

Turning now to FIG. 1, a block diagram of one embodiment of a system 100 is shown. As illustrated in the embodiment of FIG. 1, system 100 may include a processing unit 110A, a cache 120A, a local memory 130A, a processing unit 110B, a cache 120B, a local memory 130B, a shared memory 150, and a system interconnect 115. System 100 may be configured to implement a software-based cache coherence protocol, as will be further described below with reference to FIGS. 2-5.

Processing units 110 may each include a processor in the SPARC™ family of processors. However, it is contemplated that in other embodiments, processing units 110 may each include other types of processors such as a processor in the x86 family of processors, for example. It is noted that in some embodiments system 100 may include additional processing units 110. Each processing unit 110 may include one or more processor threads, a load balancer, and a coherence handler. As will be described further below, the processor threads of processing unit 110 may use the load balancer and coherence handler to perform cache coherence operations.

Shared memory 150 may be memory that can be accessed by both processing unit 110A and processing unit 110B. Local memory 130A and 130B and cache 120A and 120B may be memory that may only be accessed via the corresponding processing unit 110. In various embodiments, shared memory 150 and local memory 130 may constitute the main memory of system 100. Cache 120 may be a smaller, faster memory that stores copies from the most frequently used main memory locations. In some embodiments, cache 120 may be a level 2 (L2) and/or a level 3 (L3) cache, and processing units 110 may include an internal level 1 (L1) cache. As will be described further below, cache 120 may provide coherence information to the corresponding processing unit 110 to perform cache coherence operations. It is noted, however, that in other embodiments the main memory and cache subsystem of system 100 may have other configurations. For instance, in some embodiments, at least a portion of local memory 130A, cache 120A, and/or shared memory 150 may be on-chip with processing unit 110A. Also, in various embodiments, shared memory 150 may be distributed or split into subunits, which may connect directly to processing unit 110A and/or processing unit 110B. Furthermore, in some embodiments, local memory may be nonexistent or may be a portion of shared memory 150.

Shared memory 150, local memory 130, and cache 120 may include one or more memory modules, e.g., configured as Dual In-Line Memory Modules (DIMMs). It is noted, however, that in other embodiments shared memory 150, local memory 130, and/or cache 120 may have other configurations. The memory modules of shared memory 150, local memory 130, and cache 120 may include memory devices in the Dynamic Random Access Memory (DRAM) family of devices. For example, a plurality of banks of Synchronous DRAM (SDRAM), Double Data Rate (DDR) SDRAM, DRR2 SDRAM, or Rambus DRAM (RDRAM) devices may be include in each of the memory modules. It is noted, however, that in other embodiments the memory modules may include other types of memory devices.

System interconnect 115 is illustrative of any interconnect structure for coupling a plurality of processors in system 100, e.g., processors 110A and 110B, and shared memory 150. For instance, in one embodiment, system interconnect 115 may be formed by a shared bus.

System 100 may be comprised in any of various types of computing or processing systems, e.g., a workstation, a personal computer (PC), a portable computer system, a server, among others. For instance, in one specific implementation, system 100 may be a circuit board or motherboard of a computer system. In general, the term "computer system" can be broadly defined to encompass any device (or combination of devices) having at least one processor that executes instructions from a memory medium. In some embodiments, system 100 may be included within a combination of devices, which in some instances form a network, e.g., a local area network (LAN) or a wireless network.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, in various embodiments, system 100 may include three or more processing units and the associated memory components.

Figure 2:
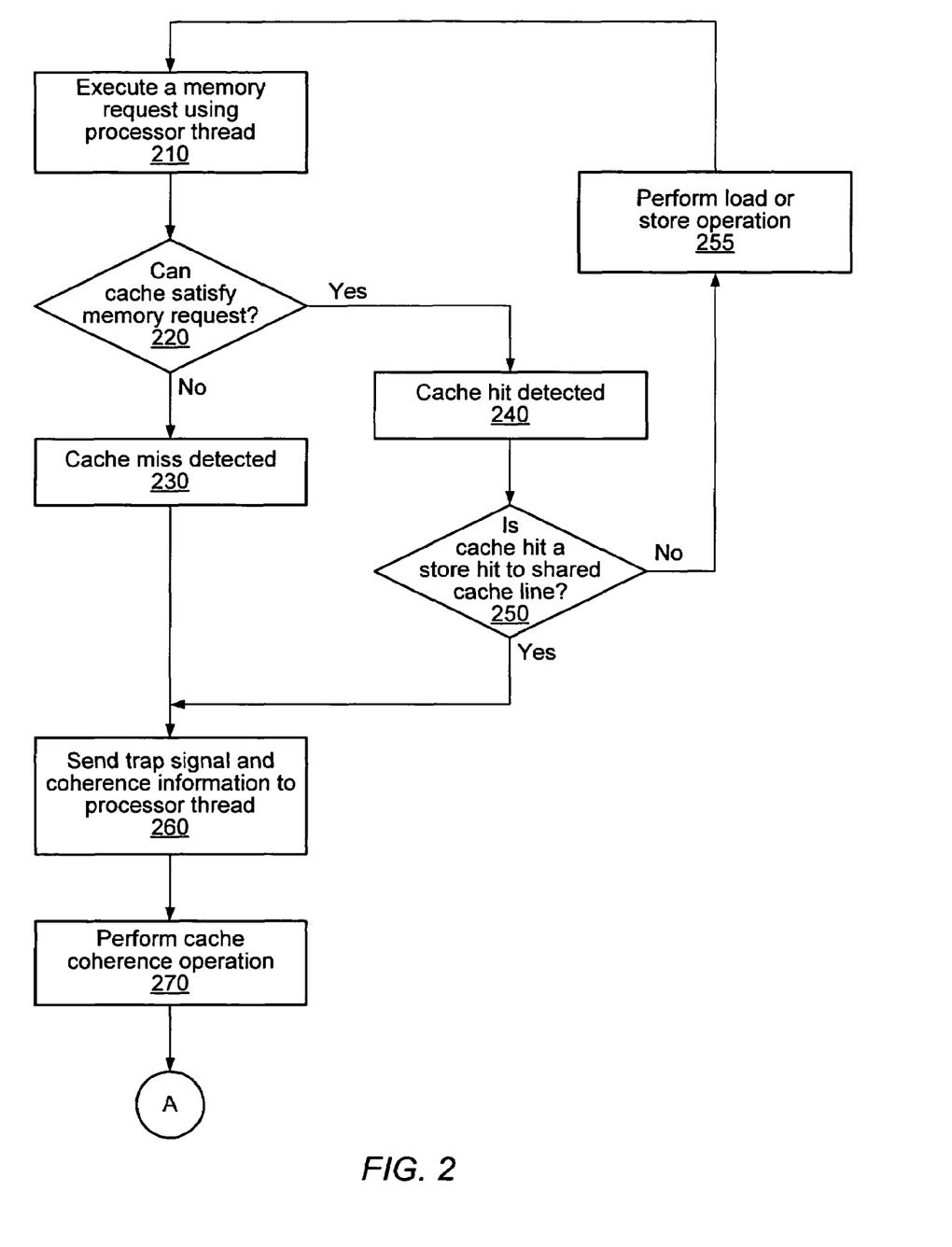
FIG. 2 is a flow diagram illustrating a method for implementing a software-based cache coherence protocol, according to one embodiment.

FIG. 2 is a flow diagram illustrating a method for implementing a software-based cache coherence protocol in system 100, according to one embodiment. It should be noted that in various embodiments, some of the steps shown may be performed concurrently, in a different order than shown, or omitted. Additional steps may also be performed as desired.

Referring collectively to FIG. 2 and FIG. 1, during operation, one of the processor threads of processing unit 110A may execute a memory request (block 210), for example, a load or a store operation. The memory request may be first provided to cache 120A to determine whether it can satisfy the memory request (block 220). If cache 120A cannot satisfy the memory request, a cache miss is detected (block 230). In response to detecting a cache miss, cache 120A may send a trap signal and coherence information to the processor thread of processing unit 110A (block 260).

A trap signal may be a signal that indicates a cache coherence condition to change the normal flow of execution and initiate a cache coherence operation. In one embodiment, the trap signal may be one general trap signal indicating a general cache coherence issue. In other embodiments, the trap signal may be one of various types of trap signals indicating a specific kind of cache coherence issue. For instance, the trap signal may indicate whether the cache coherence issue is a load miss, a store miss, or a store hit to shared. In addition, in some embodiments, when at least a portion of shared memory 150 is distributed across processing units 110A and 110B, the trap signal may indicate whether the home node for the data associated with the memory request is the local node including processing unit 110A or a remote node including processing unit 110B.

The coherence information provided to the processing thread may include at least an address associated with the cache miss, i.e., the miss address. Furthermore, if cache 120A is configured as a write-back cache, the coherence information provided to the processing thread may also include a write-back address and a write-back buffer pointer. In write-back caches, writes to the cache are not immediately mirrored to main memory. Instead, the write-back cache tracks which locations have been written over and these locations are marked "dirty". The data in these locations is written back to main memory when that data is evicted from the cache. By sending the coherence information with the trap signal, the processor thread does not have to read the cache after receiving the trap signal to obtain the miss address or write-back information; therefore, it may speed up execution of the cache coherence operations.

After receiving the trap signal and the coherence information, the processor thread may perform a cache coherence operation (block 270), as will be described further below with reference to FIG. 3.

If cache 120A can satisfy the memory request, a cache hit is detected (block 240). Then, cache 120A may determine whether the cache hit is a store hit to shared cache line (a cache line that exists in cache 120A and typically in other caches, such as cache 120B) (block 250). In response to detecting a store hit to shared cache line, cache 120A may send a trap signal and coherence information to the processor thread of processing unit 110A (block 260). After receiving the trap signal and the coherence information, the processor thread may perform a cache coherence operation (block 270). In this case, the coherence information may include the address associated with the cache hit, so that that coherence may be achieved across the two or more nodes of system 100. If the cache hit is not a store hit to shared cache line, the cache may complete the memory request, e.g., by performing load or store operation (block 255). Then, the process starts over, i.e., one of the processor threads of processing unit 110A may execute a memory request (block 210).

Figure 3:
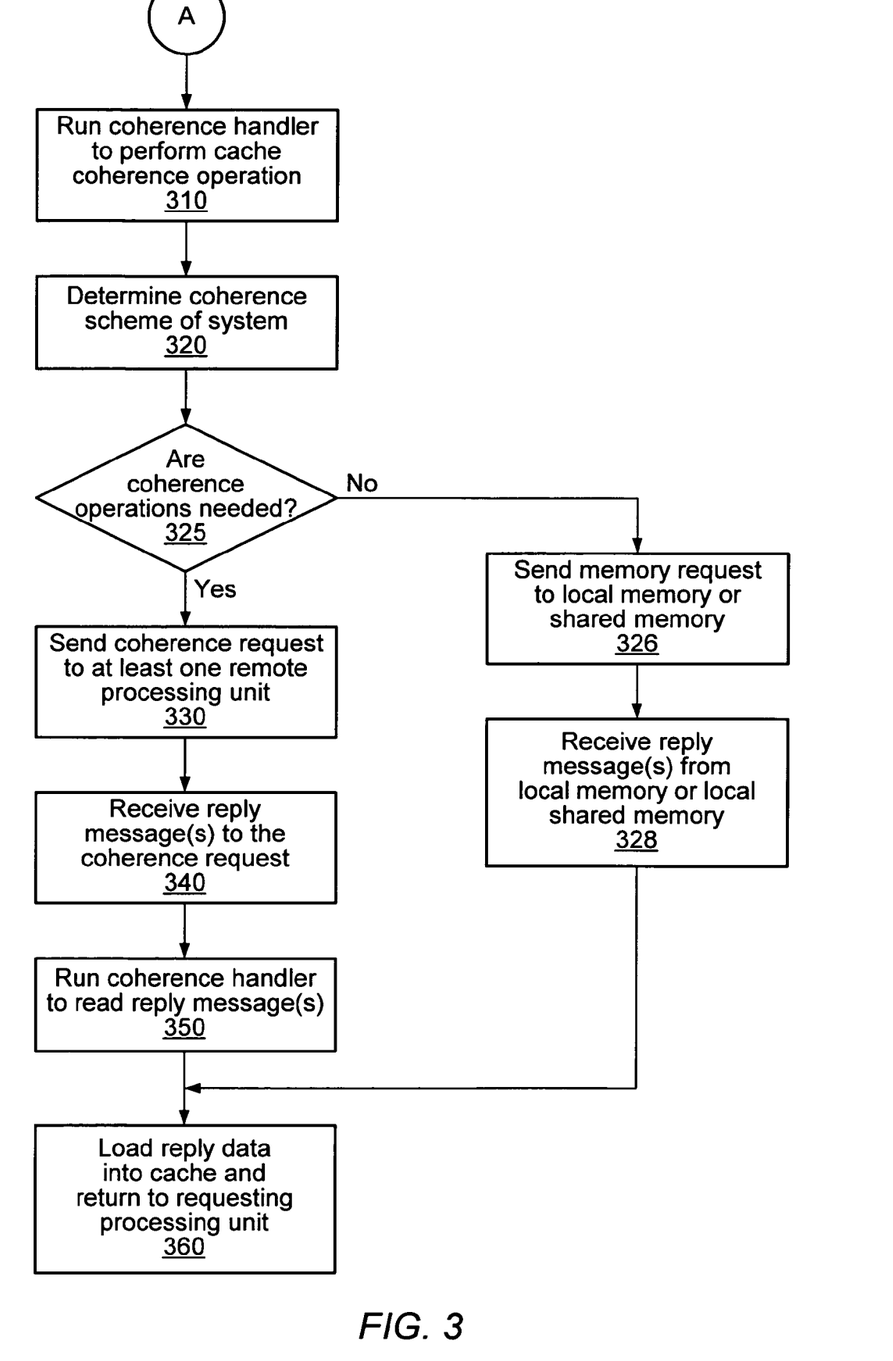
FIG. 3 is a flow diagram illustrating a method for performing a cache coherence operation for the software-based cache coherence protocol, according to one embodiment.

FIG. 3 is a flow diagram illustrating a method for performing a cache coherence operation for the software-based cache coherence protocol of system 100, according to one embodiment. It should be noted that in various embodiments, some of the steps shown may be performed concurrently, in a different order than shown, or omitted. Additional steps may also be performed as desired.

Referring collectively to FIG. 3 and FIG. 1, after receiving the trap signal and coherence information, the processor thread of processing unit 110A may run a coherence handler to perform the cache coherence operation using the received coherence information, e.g., the miss address (block 310). The coherence handler may first determine the cache coherence scheme of system 100 (block 320). For instance, the coherence handler may determine whether to use a directory-based, snoopy-based, or filtered snoopy-based (i.e., a hybrid between directory and snoopy) coherence scheme to perform the cache coherence operation. The coherence handler may also determine whether coherence operations are needed (block 325).

If coherence operations are needed, the coherency handler may send coherence requests to at least one remote processing node, e.g., processing unit 110B, for processing (block 330). For instance, in some embodiments (e.g., for a directory-based scheme), the coherence handler may load a directory entry (or other state) from local memory 130 and determine which coherence requests to send to processing unit 110B. For a snoopy-based coherence scheme, the coherence handler may broadcast snoop requests. After sending out the coherence requests, the coherence handler of processing unit 110A may enter a sleep state.

The one or more remote processing nodes may process the received coherence requests and generate reply messages for the requesting processing node (e.g., processing unit 110A), as will be further described below with reference to FIG. 4. The processor thread of processing unit 110A may receive one or more reply messages from the one or more remote processing nodes (block 340). The processor thread may run the coherence handler to read the reply messages (block 350). For instance, in one embodiment, the reply messages may wake up the processor thread using an interrupt that runs the coherence handler. The coherence handler may then cause the reply data of the reply messages to be loaded into cache 120A and to be returned to processing unit 110A (block 360) to complete the cache coherence operation.

If coherence operations are not needed, the memory request may be sent to local memory 130 or shared memory 150 to satisfy the request (block 326). The processor thread of processing unit 110A may subsequently receive one or more reply messages from local memory 130 or shared memory 150 (block 328). The reply data may then be loaded into cache 120A and returned to processing unit 110A (block 360). It is noted that in some embodiments the processor thread of processing unit 110A may determine whether coherence operations are needed at a different point in the process, e.g., prior to the coherence handler determining the cache coherence scheme of system 100.

Figure 4:
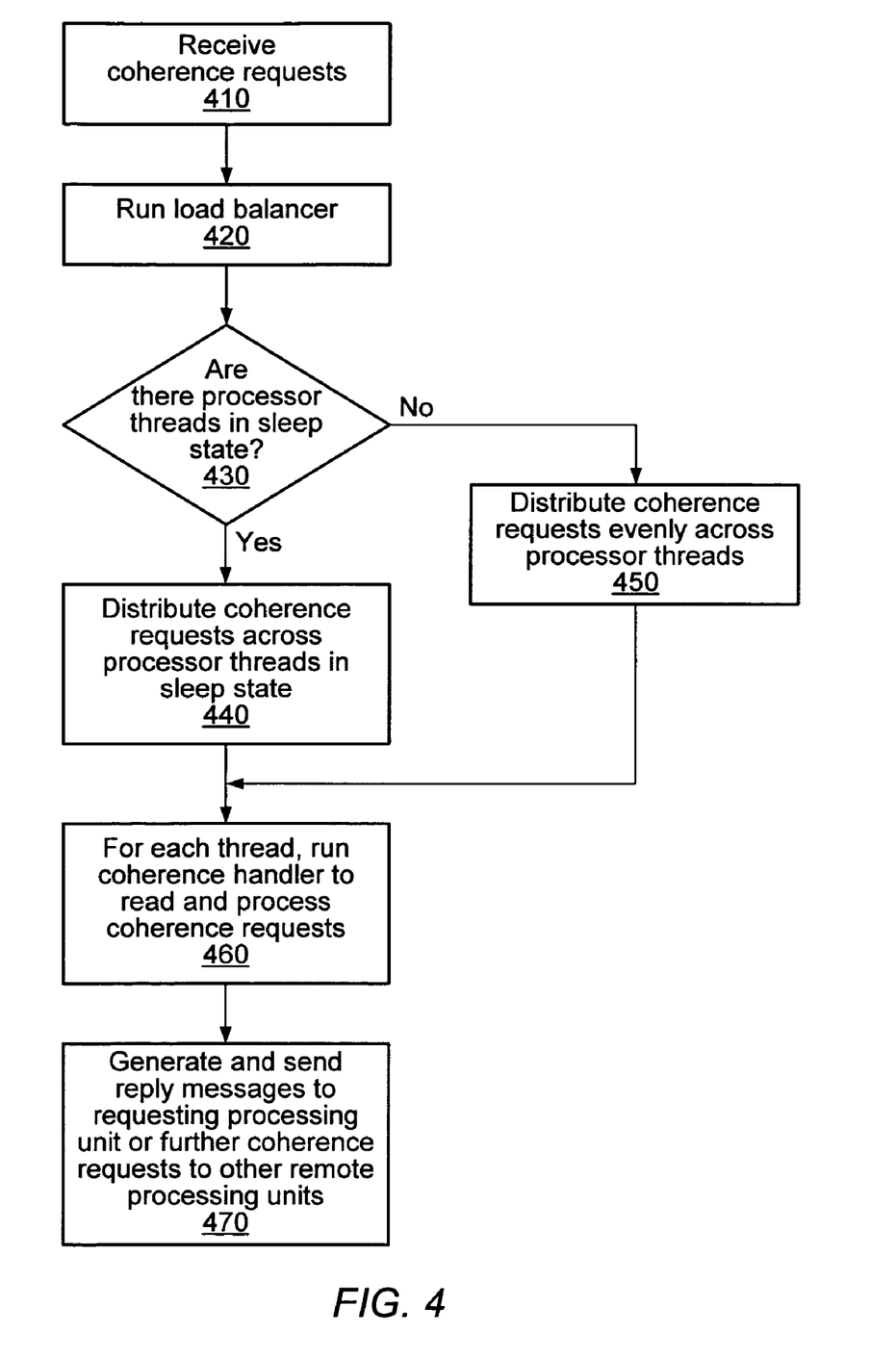
FIG. 4 is a flow diagram illustrating a method for processing coherence requests for the software-based cache coherence protocol, according to one embodiment.

FIG. 4 is a flow diagram illustrating a method for processing the coherence requests at the one or more remote nodes for the software-based cache coherence protocol of system 100, according to one embodiment. It should be noted that in various embodiments, some of the steps shown may be performed concurrently, in a different order than shown, or omitted. Additional steps may also be performed as desired.

Referring collectively to FIG. 4 and FIG. 1, the coherence request is received by at least one remote processing node, e.g., processing unit 110B (block 410). In response to receiving the coherence requests, each of the remote processing nodes may run a load balancer (block 420). The load balancer may be a mechanism for distributing the received coherence requests across the processor threads.

In various embodiments, the load balancer may first determine which processor threads of processing unit 110B are in a sleep state (block 430). If the load balancer detects that some processors threads are in a sleep state, the load balancer may then distribute the coherence requests across the processor threads that are in a sleep state (block 440). In this specific implementation, the load balancer may implement a scheme that gives preference to processor threads that are in a sleep state, e.g., waiting to receive reply messages to their own coherence request. In this implementation, if some processor threads are in a sleep state, processor threads that are performing other operations may not be interrupted. However, if there are no processor threads in a sleep state, the load balancer may distribute the coherence requests across at least a subset of the processor threads (block 450). It is noted that if only one or a few processor threads are in a sleep state, the load balancer may distribute some coherence requests to one or more processor threads in a sleep state, and the remaining coherence requests to at least some of the other processor threads that are not in a sleep state. The load balancer may distribute the coherence requests by various methods, for example, the load balancer may select processor threads randomly or using a least-recently-used scheme.

After distributing the coherence requests, each of the selected processor threads may run a coherence handler to read and process the one or more coherence requests assigned to the processor thread (block 460). The processor threads may then generate and send one or more reply messages to the requesting processing unit, i.e., processing unit 110A, or further coherence requests to other remote processing units (block 470).

It is noted that each of the processing nodes of system 100 may include a load balancer. For instance, in the illustrated embodiment of FIG. 1, processing unit 110A and processing unit 110B may include a load balancer for processing coherence requests received from remote processing nodes.

In some embodiments, the load balance may be implemented using a register that contains a bit per thread. The bits may indicate which threads are processing coherence requests or performing other coherence operations. In one specific implementation, each of the processor threads with its bit cleared may be selected randomly (or using a least-recently-used scheme) to run the coherence handler for a coherence request. After being selected, the bit associated with the processor thread may be set. Then, the processor thread may take an interrupt and run the coherence handler to read the coherence request, perform any local memory structure lookups, and generate any reply messages. After generating and sending the reply message(s), the processor thread may clear the bit in the register to indicate that it is now available to process another coherence request.

The load balancer may also include a second register, which also includes a bit per thread. The bits of the second register may indicate which processor threads are currently in a sleep state, e.g., waiting for a response to their own coherence request. In this specific implementation, each of the bits may be set when the processor thread enters the sleep state, and may be cleared when the processor thread starts to process the reply to its coherence request. In this implementation, processor threads that are in a sleep state and not currently processing coherence requests may be selected preferentially over other threads. It is noted, however, that in other embodiments the load balancer may be implemented using other mechanisms.

In various embodiments, each of caches 120 may include miss buffers to store cache miss information and/or state information after a cache miss is detected. Also, the miss buffers may be used to process and store reply data. In one specific implementation, system 100 may include one or more miss buffers in the level 1 (L1) cache and one or more miss buffers in the level 2 (L2) cache. In some embodiments, the software-based cache coherence protocol described above may provide direct read/write access to the miss buffers, which may provide flexibility to the protocol.

In some cases, for example an access to local memory 130A, after detecting a cache miss, processing unit 110A and cache 120A may not need to perform cache coherence operations. Therefore, in some embodiments, for example a design where shared memory 150 is distributed and combined with local memories 130A and 130B, processing unit 110A may send a bit along with the memory address to cache 120A that indicates whether the memory request requires cache coherence. If cache 120A detects that cache coherence is not required for a particular memory request (e.g., the bit is set), after a cache miss, cache 120A may access local memory 130A and satisfy the memory request directly rather than sending back a trap signal.

Figure 5:
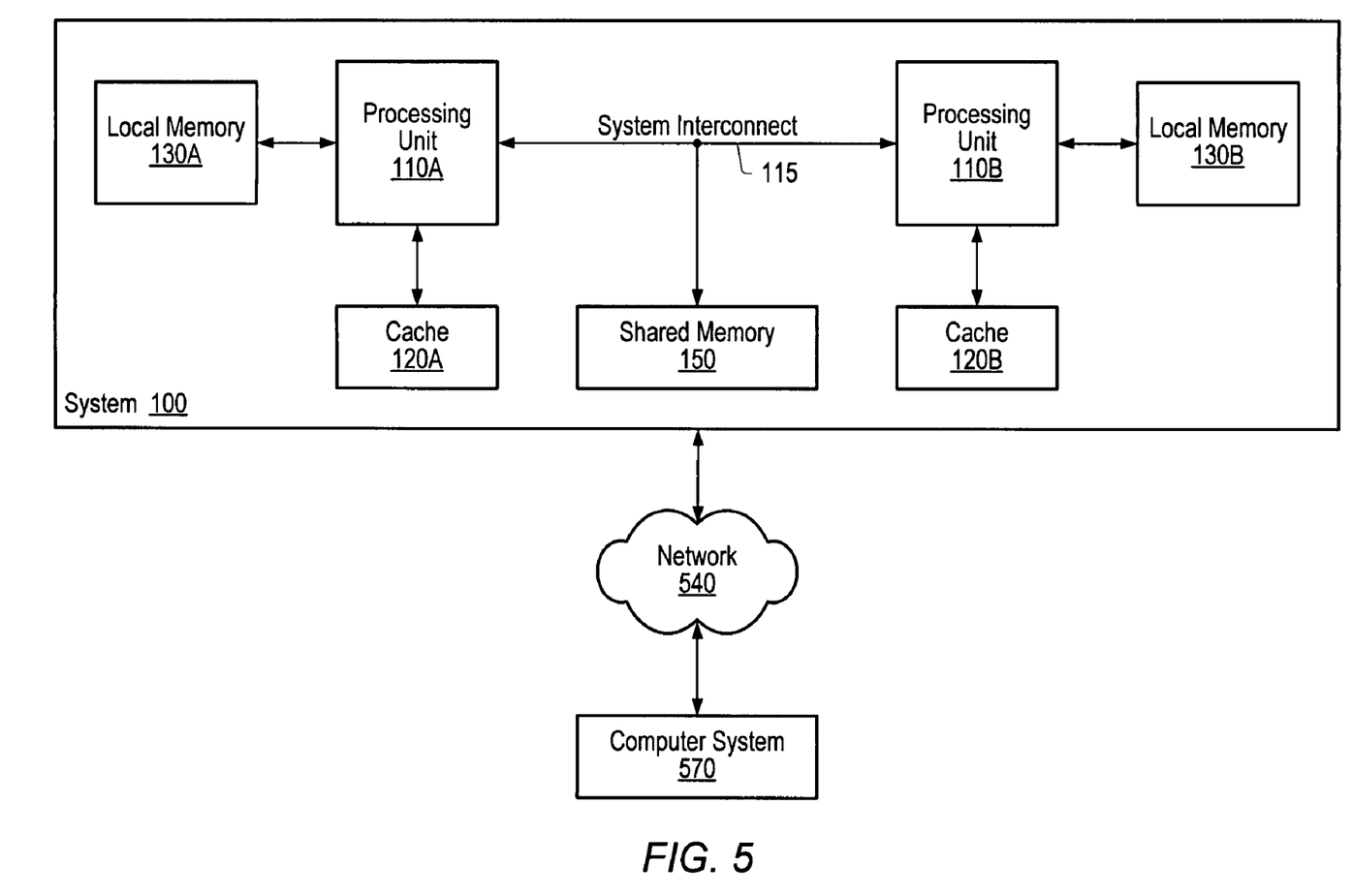
FIG. 5 is a block diagram of one embodiment of a system including the multiprocessor system of FIG. 1.

Turning now to FIG. 5, one embodiment of a system which incorporates system 100 as described above is depicted. As illustrated in the embodiment of FIG. 5, system 100 may be connected to a network 540, which may be in turn connected to a computer system 570.

Each of system 100 and computer system 570 may be any of various types of computing or processing systems, e.g., a workstation, personal computer (PC), portable computer system, server, network appliance, Internet appliance, personal digital assistant (PDA), television system, among others. System 100 and computer system 570 may be configured as a rack-mountable server system, a standalone system, or in any other suitable form factor.

Network 540 may include any suitable devices, media and/or protocol for interconnecting computer systems, such as wired or wireless Ethernet, for example. In various embodiments, network 540 may include local area networks (LANs), wide area networks (WANs), telecommunication networks, or other suitable types of networks. In some embodiments, computer system 570 may be similar to or identical in configuration to illustrated system 100, whereas in other embodiments, computer system 570 may be configured substantially different than system 100.

In various embodiments, system 100 and computer system 570 may implement the software-based cache coherence protocol described above with reference to FIGS. 1-4. In some implementations, system 100 and computer system 570 may further implement the software-based cache coherence protocol described above across network 540.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for implementing a software-based cache coherence protocol, the apparatus comprising:
   a processing unit including at least one processor thread, wherein the processing unit is configured to execute a memory request using the processor thread; and
   a cache coupled to the processing unit and configured to receive the memory request, wherein, in response to detecting a cache miss associated with the memory request, the cache is configured to provide both a trap signal and coherence information to the processor thread of the processing unit;
   wherein, in response to receiving the trap signal and the coherence information, the processor thread is configured to perform a cache coherence operation for the memory request using at least the coherence information.

2. The apparatus of claim 1, wherein the coherence information provided from the cache to the processing thread includes at least a miss address.

3. The apparatus of claim 1, wherein, if the cache is configured as a write-back cache, the coherence information provided from the cache to the processing thread includes at least a miss address, a write-back address, and a write-back buffer pointer.

4. The apparatus of claim 1, wherein, in response to detecting a cache hit to shared, the cache is configured to provide both a trap signal and coherence information to the processor thread of the processing unit.

5. The apparatus of claim 1, wherein the processing unit further comprises a coherence handler, wherein, in response to receiving the trap signal and the coherence information, the processor thread is configured to run the coherence handler to perform the cache coherence operation for the memory request using at least the coherence information.

6. The apparatus of claim 5, wherein the coherence handler is configured to send coherence requests to one or more remote processing units to perform the cache coherence operation.

7. The apparatus of claim 6, wherein the processor thread is configured to receive reply data from the one or more remote processing units, wherein the same processor thread that executed the memory request and sent the coherence requests is configured to receive and process the reply data.

8. The apparatus of claim 5, wherein the coherence handler is configured to determine whether the cache coherence operation is based on a directory-based, snoopy-based, or a filtered snoopy-based cache coherence scheme.

9. The apparatus of claim 1, wherein the processing unit includes a plurality of processor threads and a load balancer, wherein the load balancer is configured to receive coherence requests from one or more remote processing units, wherein the load balancer is configured to distribute the received coherence requests across the plurality of processor threads of the processing unit.

10. The apparatus of claim 9, wherein the load balance is configured to determine an operational state of each of the plurality of processor threads, wherein the load balancer is configured to distribute the coherence requests across at least a subset of the plurality of processor threads based on the operation state of the processor threads.

11. The apparatus of claim 10, wherein the load balancer is configured to preferentially distribute the coherence requests across the processor threads that are in a sleep state.

12. The apparatus of claim 1, wherein the cache is a level 2 (L2) cache.

13. A method for implementing a software-based cache coherence protocol, the method comprising:
   executing a memory request using a processor thread of a processing unit;
   receiving the memory request at a cache;
   in response to detecting a cache miss associated with the memory request, providing both a trap signal and coherence information to the processor thread of the processing unit using the cache; and
   in response to receiving the trap signal and the coherence information, performing a cache coherence operation for the memory request using at least the coherence information.

14. The method of claim 13, further comprising, in response to detecting a cache hit to shared, providing both a trap signal and coherence information to the processor thread of the processing unit using the cache.

15. The method of claim 13, wherein said performing a cache coherence operation includes sending coherence requests to at least one remote processing unit.

16. The method of claim 13, further comprising:
receiving coherence requests at the processing unit from a remote processing unit;
determining an operational state of each of a plurality of processor threads of the processing unit using a load balancer; and
distributing the received coherence requests across at least a subset of the plurality of processor threads based on the operation state of the processor threads.

17. A system for implementing a software-based cache coherence protocol, the system comprising:
a first processing unit including a plurality of processor threads, wherein the first processing unit is configured to execute a memory request using one of the plurality of processor threads;
a cache coupled to the first processing unit and configured to receive the memory request, wherein, in response to detecting a cache miss associated with the memory request, the cache is configured to provide both a trap signal and coherence information to the processor thread of the first processing unit; and
at least one remote processing unit coupled to the first processing unit, wherein the remote processing unit includes a plurality of processor threads and a load balancer;
wherein, in response to receiving the trap signal and the coherence information, the processor thread of the first processing unit is configured to send coherence requests to the remote processing unit to perform a cache coherence operation;
wherein the load balancer of the remote processing unit is configured to receive the coherence requests and distribute the coherence requests across the plurality of processor threads of the remote processing unit.

18. The system of claim 17, wherein, in response to detecting a cache hit to shared, the cache is configured to provide both a trap signal and coherence information to the processor thread of the processing unit.

19. The system of claim 17, wherein the load balance is configured to determine an operational state of each of the plurality of processor threads of the remote processing unit, wherein the load balancer is configured to distribute the coherence requests across at least a subset of the plurality of processor threads based on the operation state of the processor threads.

20. The system of claim 17, wherein the remote processing unit is configured to process the received coherence requests and send reply data to the processor thread of the first processing unit to process the reply data, wherein the remote processing unit is configured to send the reply data to the same processor thread that executed the memory request and sent the coherence requests.

* * * * *